United States Patent [19]

Reau et al.

[11] 4,184,015
[45] Jan. 15, 1980

[54] AMORPHOUS CATIONIC CONDUCTORS

[75] Inventors: Jean-Maurice Reau, Floirac; Alain Levasseur; Claude Fouassier, both of Gradignan; Bernard Cales, Orleans; Paul Hagenmuller, Valence, all of France

[73] Assignee: Compagnie Generale d'Electricite S.A., Paris, France

[21] Appl. No.: 896,527

[22] Filed: Apr. 17, 1978

[30] Foreign Application Priority Data

Apr. 15, 1977 [FR] France ............... 77 11376

[51] Int. Cl.² .............................................. H01B 1/06
[52] U.S. Cl. ...................................... 429/193; 252/518
[58] Field of Search ............... 252/518; 429/193, 191; 106/47 R

[56] References Cited

U.S. PATENT DOCUMENTS

| | | | |
|---|---|---|---|
| 3,877,995 | 4/1975 | Levine et al. | 429/104 |
| 3,911,085 | 10/1975 | Bither, Jr. et al. | 429/191 X |
| 3,926,649 | 12/1975 | Ray et al. | 106/47 R |

*Primary Examiner*—Benjamin R. Padgett
*Assistant Examiner*—E. Suzanne Parr
*Attorney, Agent, or Firm*—Sughrue, Rothwell, Mion, Zinn and Macpeak

[57] ABSTRACT

An amorphous cationic conductor of lithium comprising a composition corresponding to the general formula:

$$\{B_2O_3, xM, yN\}, aLi_2O, bLi_zQ\,11$$

in which:

M is chosen from the group formed by:

$$Al_2O_3, V_2O_5, P_2O_5, As_2O_5\ As_2O_3;$$

N is chosen from the group formed by:

$$SiO_2\ \text{and}\ GeO_2;$$

Q is chosen from the group formed by halogen anions and bi- or tri-valent mono- or poly-atomic anions exclusive of $O^{2-}$;

$0 \leq x \leq 0.35$;
$0 \leq y \leq 0.8$;
$0 < a \leq 2$;
$0 < b < 1.5$;

$b \leq 2a$; and
z = 1 or 2 or 3 according to whether Q is mono-, bi- or tri-valent.

16 Claims, 1 Drawing Figure

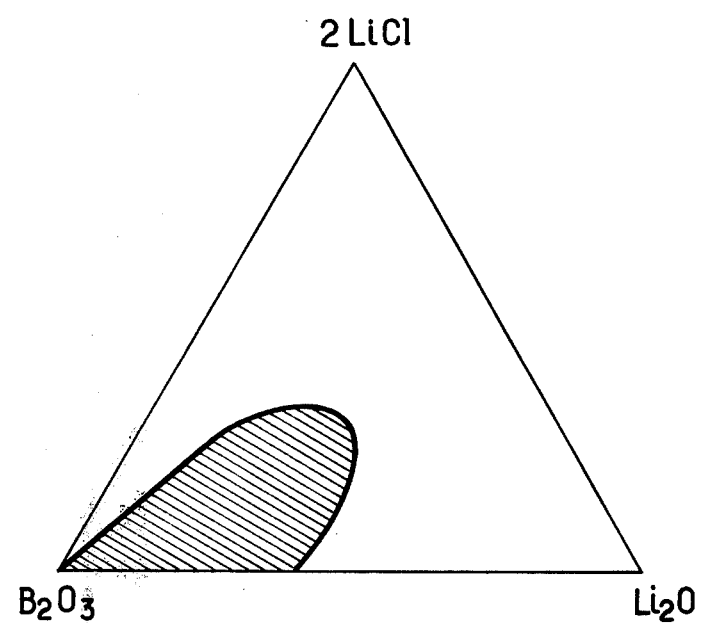

AMORPHOUS CATIONIC CONDUCTORS

The present invention relates to new amorphous cationic conductors in the form of glass. These amorphous conductors have remarkable ionic conductivity which make them suitable for producing electric cells with membranes or electrodes which are specific to lithium for selecting lithium ions from solution and for controlling the quantity of ions passed.

It is known that a number of materials can perform the function of a solid electrolyte in electric cells. These materials constitute ionic conductors and are called anionic conductors in the case where the moving ion is an anion and cationic conductors in the case where the moving ion is a cation.

Of all cationic conductors, β alumina is the most often used. Its electric conductivity goes from $5.10^{-2}$ $\Omega^{-1}.cm^{-1}$ at 100° C. to $5.10^{-1}$ $\Omega^{-1}.cm^{-1}$ at 300° C. However, its use is limited by the low current output available.

Further, this compound has a very high melting temperature. Very great technical difficulties result therefrom depending on the extent to which it is necessary to obtain sintered compounds which are in the form of monocrystals either of very dense ceramics or in the form of thin layers deposited by evaporation in a vacuum. By way of indication, it is mentioned that a temperature of 1850° is required to sinter a β alumina ceramic.

U.S. Pat. No. 3,911,085 describes new cationic conductors which have a conductivity which is substantially equivalent to that of β alumina in the same temperature range but which have a melting point which is lower. These compounds are constituted by lithium boracites and correspond in particular to the formula $Li_4B_7O_{12}X$ where X is a halogen. For example, the melting point of the boracite whose formula is $Li_4B_7O_{12}Cl$ is about 850° C. and its conductivity at 300° C. is $10^{-2}$ $\Omega^{-1}cm^{-1}$. But these compounds are obtained in the crystalline form, which makes their preparation expensive, since it is necessary to sinter them. Further, generally, it is difficult to obtain a compactness greater than 90%, this limiting the possibilities of use of these materials.

Further, vitreous compositions are known as solid electrolytes. These compositions have the advantage of being easier to prepare and above all of being perfectly impermeable with respect to the diffusion of atoms and of molecules—a great problem in the manufacture of electric cells, since diffusion can lead to self-discharge of the system. Thus, in particular, U.S. Pat. No. 3,877,995 and French Pat. No. 2,249,042 describe respectively ternary vitreous compositions $B_2O_3$—$Na_2O$—NaX and $B_2O_3$—$K_2O$—KX where X represents a halogen. However, the uses of such compositions are limited due to the fact that only low conductivities can be obtained.

The invention aims to make available to the man in the art new compounds in the form of glass which can be used as a cationic conductor and which have about the same conductivity as that of β alumina.

It further aims to apply these compounds, which are unaffected by water, for producing electrodes specific to lithium for regulating the quantity of Li+ ions which are present in various solutions. It also relates to the application of these compounds to the production of specific membranes for producing and purifying solutions which contain lithium ions and to the production of solid electrolytes for electric cells.

The invention therefore provides an amorphous cationic conductor of lithium comprising a composition corresponding to the general formula:

$$\{B_2O_3, xM, yN\}, aLi_2O, bLi_zQ$$

in which:
M is chosen from the group formed by:

$$Al_2O_3, V_2O_5, P_2O_5, As_2O_5, As_2O_3;$$

N is chosen from the group formed by:
$SiO_2$ and $GeO_2$;

Q is chosen from the group formed by halogen anions and bi- or tri-valent mono- or poly-atomic anions exclusive of $O^{2-}$;

$0 \leq x \leq 0.35$;
$0 \leq y \leq 0.8$;
$0 < a \leq 2$;
$0 < b < 1.5$;
$b \leq 2a$; and
z=1 or 2 or 3 according to whether Q is mono-, bi- or tri-valent.

The man in the art could not anticipate that by replacing sodium or potassium by lithium in the compositions which are set forth in the patents cited hereinabove, compositions would be obtained which have satisfactory conductivity. On the contrary, he was led to suppose that the properties of lithium compositions would be analogous to those of their alkaline counterparts. The improvement of the conductivity does not result directly from the intrinsic electrical properties of the Li+ ion, but from the surprisingly greater range over which lithium glasses can exist which makes it possible to use greater quantities of lithium salts. However, it was impossible to know, a priori, that the increase in the quantity of lithium salt would increase the conductivity.

According to the invention Q is chosen advantageously from the group formed by: $F^-$, $Cl^-$, $Br^-$, $S^{2-}$, $SO_4^{2-}$, $MoO_4^{2-}$, $WO_4^{2-}$, $N^{3-}$, or $PO_4^{3-}$.

In the compound according to the invention, the presence of $B_2O_3$ as forming oxide is essential and the compounds M and N, when they are present, must be considered only as additives in particular for extending the vitreous range.

The invention also relates to a method of manufacturing the cationic conductors previously defined characterized by the fact that the starting products—boric anhydride, lithium oxide or a compound giving rise to $Li_2O$ such as $Li_2CO_3$ or LiOH, lithium salt and possibly M and N compounds—are melted for about five minutes at a temperature lying between 700° and 1200° C., then they are hardened and annealed at a temperature about 50° C. lower than the recrystallization temperature of the cationic conductor in question, for about 15 hours.

In the case where $Li_2O$ is volatile at preparation temperatures, it is necessary, to reach the final composition indicated, for an extra quantity to be added systematically to the starting mixture of this compound. This addition mitigates the slight volatility of this compound at the temperature at which melting takes place.

The ionic conductivity of the amorphous compounds in accordance with the invention is due to the movement of the lithium ion. These compounds are therefore particularly suitable for acting as solid electrolytes in electric cells, in particular those which comprise an anode based on lithium and a cathode constituted by a material with a host structure for lithium. A cell which comprises a solid electrolyte in accordance with the present invention, an anode based on lithium and a titanium sulphide cathode has been produced. This cell has good reversibility and is characterized by a high electromotive force.

Preferred amorphous compounds of lithium whose characteristics have been set forth hereinabove have numerous advantages in comparison with those known in the art and in particular one or several of the following:

that of having a lower melting point, which facilitates production;

that of being ionic conductors for lithium ions which are lighter than the other alkaline ions, in particular sodium ions and which are suitable for providing higher voltages;

that of being excellent ionic conductors in a temperature range adapted to industrial applications; and that of being easy to mould and to adapt to industrial technology, which is a considerable advantage from the point of view of use.

Further, the cationic conductors in accordance with the invention have the advantage of being manufacturable by simple and inexpensive technique.

In accordance with an embodiment of the invention, in the above formula, we have $x=y=0$, which leads to the following definition:

$B_2O_3$, a $Li_2O$, b $Li_zQ$

The following conditions are then advantageously fulfilled:
$0 < a \leq 0.85$
if $z=1$, Q is chosen from $F^-$, $Cl^-$, $Br^-$ and $b \leq 0.85$
if $z=2$, Q is chosen from $S^{2-}$ and $SO_4^{2-}$ and $b \leq 0.3$
if $z=3$, Q is chosen from $N^{3-}$ and $PO_4^{3-}$ and $b \leq 0.2$ By way of illustration, such amorphous conductors can have the following formulae:

$B_2O_3$, 0.57 $Li_2O$, 0.57 LiCl $B_2O_3$, 0.85 $Li_2O$, 0.29 LiCl $B_2O_3$, 0.43 $Li_2O$, 0.29 LiCl $B_2O_3$, 0.57$Li_2O$, 0.21LiCl $B_2O_3$, 0.57$Li_2O$, 0.21LiBr $B_2O_3$, 0.57$Li_2O$, 0.29$Li_2S$ $B_2O_3$, 0.57$Li_2O$, 0.29$Li_2SO_4$ $B_2O_3$, 0.57$Li_2O$, 0.14$Li_3PO_4$ $B_2O_3$, 0.57$Li_2O$, 0.14$Li_3N$

According to another embodiment, we have advantageously $y=0$ $0 < x \leq 0.30$ $0 < a \leq 0.85$ if $z=1$, Q is chosen from $F^-$, $Cl^-$, $Br^-$ and $b \leq 1$
if $z=2$, Q is $SO_4^{2-}$ and $b \leq 0.3$
if $z=3$, Q is $PO_4^{3-}$ and $b \leq 0.2$ By way of illustration, such cationic conductors can have the following formulae:

$B_2O_3$, 0.28$Al_2O_3$, 0.57$Li_2O$, LiCl $B_2O_3$, 0.14$Al_2O_3$, 0.57$Li_2O$, 0.28$LiSO_4$ $B_2O_3$, 0.14$P_2O_5$, 0.57$Li_2O$, 0.21LiBr $B_2O_3$, 0.14$Al_2O_3$, 0.57$Li_2O$, 0.21LiBr $B_2O_3$, 0.14$Al_2O_3$, 0.57$Li_2O$, 0.14$Li_3PO_4$ $B_2O_3$, 0.14$Al_2O_3$, 0.57$Li_2O$, 0.57LiF $B_2O_3$, 0.14$Al_2O_3$, 0.57$Li_2O$, 0.70LiCl

In accordance with another embodiment, we have:

$x=0$, $0 < y \leq 0.7$ advantageously
$0 < a \leq 1.7$ if $z=1$, Q is chosen from $F^-$, $Cl^-$, $Br^-$ and $b \leq 1$
if $z=2$, Q is $SO_4^{2-}$ and $b \leq 1.2$ By way of illustration, such cationic conductors can have the following formulae:

$B_2O_3$, 0.57$SiO_2$, 1.70$Li_2O$, $Li_2SO_4$ $B_2O_3$, 0.43$SiO_2$, $Li_2O$, 1.14$Li_2SO_4$ $B_2O_3$, 0.57$SiO_2$, 1.5$Li_2O$, $Li_2SO_4$ $B_2O_3$, 0.43$SiO_2$, 1.43$Li_2O$, 1.14$Li_2SO_4$

The invention will be better understood from the following description and examples and on referring to the accompanying drawing in which the single FIGURE is a ternary molar diagram drawn in the case where ($x=y=0$ and $Q=Cl^-$) showing in a shaded part the range over which amorphous conductors in accordance with the invention can exist.

The following examples illustrate the invention without limiting the scope thereof.

EXAMPLE 1

The glass which has the final composition $B_2O_3$-0.43$Li_2O$-0.29LiCl is prepared.

7 moles of $B_2O_3$, 3 moles of $Li_2O$ and 2.5 moles of LiCl are intimately mixed in the form of powder. The mixture thus obtained is brought to its melting point at a temperature of about 850° C. in a platinum crucible. This temperature is maintained for 5 minutes.

The molten mixture is cooled rapidly in air. The glass obtained is then annealed at a temperature of about 400° C. for 15 hours.

An identical final composition is obtained when starting with a molar mixture containing 6 moles of LiOH instead of 3 moles of $Li_2O$.

The conductivity of the glass thus prepared is measured in a conventional manner and the following values are obtained:

100° C. $1.1 \times 10^{-5} \, \Omega^{-1}.cm^{-1}$

200° C. $3.4 \times 10^{-4} \, \Omega^{-1}.cm^{-1}$

300° C. $2.9 \times 10^{-3} \, \Omega^{-1}.cm^{-1}$

This glass has excellent transparence in the visible spectrum and in the infra-red spectrum and has a high refractive index.

A cell which includes a lithium anode and a titanium sulphide cathode is produced. The electrolyte placed between the two electrodes is constituted by the cationic conductor described above and is in the form of a flat transparent disc with a thickness of about 1 mm and a diameter of 15 mm. This cell has good reversibility and a very high voltage E=2.94 volts.

EXAMPLE 2

Glasses having the following final molar compositions and whose conductivities are measured in $\Omega^{-1}.cm^{-1}$ at the temperatures shown are prepared in accordance with the method of example 1.

|  | 100° C. | 200° C. | 300° C. |
|---|---|---|---|
| $B_2O_3$, $0.57Li_2O$, $0.21LiCl$ | $6.3 \times 10^{-6}$ | $2.0 \times 10^{-4}$ | $1.8 \times 10^{-3}$ |
| $B_2O_3$, $0.57Li_2O$, $0.57LiCl$ | $1.1 \times 10^{-4}$ | $2.4 \times 10^{-3}$ | $1.7 \times 10^{-2}$ |
| $B_2O_3$, $0.85Li_2O$, $0.29LiCl$ | $3.7 \times 10^{-5}$ | $8.8 \times 10^{-4}$ | $7.8 \times 10^{-3}$ |

It is observed that for a given quantity of boric anhydride, the greater the concentration of $Li_2O$ and especially of LiCl, the higher the conductivity. However, the conductivity does not seem directly related to the number of $Li^+$ ions, but rather to the concentration of lithium salt.

The voltage delivered by a cell of the same type as above and which includes solid electrolytes constituted by one of these glasses is about 2.94 volts.

The indices of refraction as well as the qualities of transparency are analogues to the values obtained for the glass prepared in example 1.

EXAMPLE 3

A glass whose final composition is $B_2O_3$–0.5-$7Li_2O$–0.21LiBr is prepared from a molar mixture of $7B_2O_3$, $4Li_2O$, $2LiBr$ which is treated in accordance with the method described in example 1.
The following values of conductivity are obtained:
100° C. $6.0 \times 10^{-6} \, \Omega^{-1}.cm^{-1}$
200° C. $2.0 \times 10^{-4} \, \Omega^{-1}.cm^{-1}$
300° C. $2.0 \times 10^{-3} \, \Omega^{-1}.cm^{-1}$
The activation energy $\Delta H$ (related to the slope of the conductivity curve) is: $\Delta H = 0.53$ eV.

It is seen that the conductivity of the glass in accordance with the invention decreases when LiCl is replaced by LiBr. Generally, it has been observed that the conductivity is better when LiCl is used.

EXAMPLE 4

A glass whose final composition is $B_2O_3$–0.57 $Li_2O$–0.21LiBr–0.14$P_2O_5$ is prepared from a molar mixture of $7B_2O_3$, $4Li_2O$, $2LiBr$, $P_2O_5$ which is treated in accordance with the method described in example 1. However, the melting temperature is 750° C.
The conductivity measured at 200° C. is:

$1.58 \times 10^{-4} \, \Omega^{-1}.cm^{-1}$

The activation energy $\Delta H$ is: $\Delta H = 0.53$ eV
It is observed that $P_2O_5$ in this glass causes a lowering of the melting point. In this example, the melting temperature is lowered by about 100° C. In contrast, the recrystallization temperature is the same in both cases (Tc=470° C.) and the conductivity does not vary appreciably.

EXAMPLE 5

A glass whose final composition is $B_2O_3$–0.5-$7Li_2O$–0.21LiBr–0.14$Al_2O_3$, is prepared from the mixture $7B_2O_3$, $4Li_2O$, $2LiBr$, $Al_2O_3$ which is treated in accordance with the method described in example 1. However, the melting point is 950° C. and the annealing temperature is 500° C.
The conductivity measured at 200° C. is:

$8.32 \times 10^{-5} \, \Omega^{-1}.cm^{-1}$

The activation energy $\Delta H$ is: $\Delta H = 0.59$ eV.
It is observed that $Al_2O_3$ makes it possible to stablize the glass and to obtain pieces which have a larger volume without the conductivity being appreciably modified.

EXAMPLE 6

A glass whose final composition is $B_2O_3$–0.5-$7Li_2O$–0.29$Li_2S$ is prepared from a mixture which has the same initial molar composition and which is treated in accordance with the method described in example 1 but which is protected from water. Further, the starting mixture is placed in a crucible which is enclosed in a sealed silica bulb in which there is a vacuum and the melting point is 900° C.
The conductivity of the glass obtained measured at 200° C. is:

$2.0 \times 10^{-3} \, \Omega^{-1}.cm^{-1}$

The activation energy $\Delta H$ is: $\Delta H = 0.47$ eV

EXAMPLE 7

A glass whose final molar composition is $B_2O_3$–0.5-$7Li_2O$–0.29$Li_2SO_4$ in accordance with the method described in example 1 is prepared from a starting mixture which has the same molar composition. The conductivity measured is:

at 100° C. $2 \times 10^{-5} \, \Omega^{-1}.cm^{-1}$
at 200° C. $5 \times 10^{-4} \, \Omega^{-1}.cm^{-1}$
at 300° C. $4 \times 10^{-3} \, \Omega^{-1}.cm^{-1}$ The activation energy $\Delta H$ is related to the slope of the conductivity curve and is: $\Delta H = 0.49$ eV

EXAMPLE 8

A glass whose final molar composition is $B_2O_3$–0.5-$7Li_2O$–0.14$Li_3PO_4$ is prepared in accordance with the method described in example 1 starting with an initial mixture which has the same molar composition. The following results are obtained for its conductivity:

at 100° C. $10^{-5} \, \Omega^{-1}.cm^{-1}$
at 200° C. $10^{-4} \, \Omega^{-1}.cm^{-1}$
at 300° C. $1.4 \times 10^{-3} \, \Omega^{-1}.cm^{-1}$ The activation energy $\Delta H$ is related to the slope of the conductivity curve and is: $\Delta H = 0.49$ eV.

In all the preceding examples, $Li_2O$ can come indifferently from LiOH or from $Li_2CO_3$. Indeed, LiOH and $Li_2CO_3$ are decomposed to $LiO_2$ in a known manner under the effect of temperature. Of course, to obtain a final vitreous composition which comprises one mole of $Li_2O$, it is necessary to start from an initial molar mixture which contains one mole of $Li_2CO_3$ or two moles of LiOH.

Purely by way of illustration, other results are given hereinbelow which relate to the conductivity at various temperatures and the activation energy of conductors in accordance with the invention.

| | 100° C. | 200° C. | 300° C. | ΔH |
|---|---|---|---|---|
| $B_2O_3$, $0.57Li_2O$, $0.14Al_2O_3$, $0.29Li_2SO_4$ | $2.10^{-7}$ | $1.5.10^{-5}$ | $2.5.10^{-4}$ | 0.54eV |
| $B_2O_3$, $0.57Li_2O$, $0.14Al_2O_3$, $0.14Li_3PO_4$ | $4.10^{-7}$ | $1.8.10^{-6}$ | $5.10^{-5}$ | 0.79eV |
| $B_2O_3$, $0.57Li_2O$, $0.14Al_2O_3$, $0.57LiF$ | $6.3.10^{-7}$ | $2.10^{-5}$ | $1.6.10^{-4}$ | 0.52eV |
| $B_2O_3$, $0.57Li_2O$, $0.14Al_2O_3$, $0.70LiCl$ | $4.10^{-5}$ | $9.10^{-4}$ | $6.3.10^{-3}$ | 0.49eV |
| $B_2O_3$, $0.57Li_2O$, $0.29Al_2O_3$, $LiCl$ | $6.6.10^{-6}$ | $2.5.10^{-4}$ | $3.10^{-3}$ | 0.49eV |
| $B_2O_3$, $1.5Li_2O$, $0.57SiO_2$, $Li_2SO_4$ | $10^{-5}$ | $1.6.10^{-3}$ | $1.6.10^{-2}$ | 0.52eV |
| $B_2O_3$, $1.43Li_2O$, $0.42SiO_2$, $1.14Li_2SO_4$ | $5.10^{-5}$ | $2.10^{-3}$ | $1.8.10^{-2}$ | 0.50eV |
| $B_2O_3$, $0.57Li_2O$, $0.14Li_3N$, . | $2.10^{-6}$ | $10^{-4}$ | $5.10^{-3}$ | 0.65eV |

Of course, the invention is in no way limited to the examples given.

What is claimed is:

1. An amorphous cationic conductor of lithium comprising a composition corresponding to the general formula:

$$\{B_2O_3, xM, yN\}, aLi_2O, bLi_zQ$$

in which:

M is chosen from the group formed by:

$Al_2O_3$, $V_2O_5$, $P_2O_5$, $As_2O_5$ and $As_2O_3$;

N is chosen from the group formed by:

$SiO_2$ and $GeO_2$;

Q is chosen from the group consisting of: $F^-$, $Cl^-$, $Br^-$, $S^{2-}$, $SO_4^{2-}$, $MoO_4^{2-}$, $N^{3-}$, $PO_4^{3-}$ and $WO_4^{2-}$;
$0 \leq x \leq 0.35$
$0 \leq y \leq 0.8$
$0 < a \leq 2$
$0 < b < 1.5$
$b \leq 2a$; and
$z = 1$ or 2 or 3 according to whether Q is mono-, bi- or tri-valent.

2. A conductor according to claim 1, wherein in the said formula:

$x = y = 0$;
$0 < a \leq 0.85$; and
if $z = 1$, Q is chosen from $F^-$, $Cl^-$ or $Br^-$ and $b \leq 0.85$; or
if $z = 2$, Q is chosen from $S^{2-}$ or $SO_4^{2-}$ and $b \leq 0.3$; or
if $z = 3$, Q is chosen from $N^{3-}$ or $PO_4^{3-}$ and $b \leq 0.2$.

3. A conductor according to claim 1, having one of the following formulae:

$B_2O_3$, $0.57Li_2O$, $0.57LiCl$ $B_2O_3$, $0.85Li_2O$, $0.29LiCl$ $B_2O_3$, $0.43Li_2O$, $0.29LiCl$ $B_2O_3$, $0.57Li_2O$, $0.21LiCl$ $B_2O_3$, $0.57Li_2O$, $0.21LiBr$ $B_2O_3$, $0.57Li_2O$, $0.29Li_2S$ $B_2O_3$, $0.57Li_2O$, $0.29Li_2SO_4$ $B_2O_3$, $0.57Li_2O$, $0.14Li_3PO_4$ $B_2O_3$, $0.57Li_2O$, $0.14Li_3N$.

4. A conductor according to claim 1, wherein in the said formula, $y = 0$, $0 < x \leq 0.30$, $0 < a \leq 0.85$; and
if $z = 1$, Q is chosen from $F^-$; $Cl^-$, or $Br^-$ and $b \leq 1$; or
if $z = 2$, Q is $SO_4^{2-}$ and $b \leq 0.3$; or
if $z = 3$, Q is $PO_4^{3-}$ and $b \leq 0.2$.

5. A conductor according to claim 1, having one of the following formulae:

$B_2O_3$, $0.57Li_2O$, $0.28Al_2O_3$, $LiCl$ $B_2O_3$, $0.57Li_2O$, $0.14Al_2O_3$, $0.28Li_2SO_4$ $B_2O_3$, $0.57Li_2O$, $0.14P_2O_5$, $0.21LiBr$ $B_2O_3$, $0.57Li_2O$, $0.21LiBr$, $0.14Al_2O_3$ $B_2O_3$, $0.57Li_2O$, $0.14Li_3PO_4$, $0.14Al_2O_3$ $B_2O_3$, $0.57Li_2O$, $0.14Al_2O_3$, $0.57LiF$ $B_2O_3$, $0.57Li_2O$, $0.14Al_2O_3$, $0.70LiCl$.

6. A conductor according to claim 1, wherein, in the formula:

$x = 0$, $0 < y \leq 0.7$ $0 < a \leq 1.7$
if $z = 1$, Q is chosen from $F^-$, $Cl^-$ or $Br^-$ and $b \leq 1$; or
if $z = 2$, Q is $SO_4^{2-}$ and $b \leq 1.2$.

7. A conductor according to claim 1, having one of the following formulae:

$B_2O_3$, $0.57SiO_2$, $1.70Li_2O$, $Li_2SO_4$ $B_2O_3$, $0.43SiO_2$, $Li_2O$, $1.14Li_2SO_4$ $B_2O_3$, $0.57SiO_2$, $1.5Li_2O$, $Li_2SO_4$ $B_2O_3$, $0.43SiO_2$, $1.43Li_2O$, $1.14Li_2SO_4$.

8. A method of preparing an amorphous cationic conductor, of claim 1 wherein (A) the starting products—boric anhydride, lithium oxide or a compound giving rise to $Li_2O$ and lithium salt or (B) said starting products and at least one of the M and N compounds—are melted for about five minutes at a temperature lying between 700° and 1200° C., then they are hardened and annealed at a temperature about 50° C. lower than the recrystallization temperature of the cationic conductor, for about 15 hours.

9. The process of claim 8 wherein the compound giving rise to $Li_2O$ is $Li_2CO_3$ or $LiOH$.

10. A process for forming of electrodes specific to lithium which comprises forming the electrodes of a composition corresponding to the general formula:

$$\{B_2O_3, xM, yN\}, aLi_2O, bLi_zQ$$

in which:
M is chosen from the group formed by:

$Al_2O_3$, $V_2O_5$, $P_2O_5$, $As_2O_5$ and $As_2O_3$;

N is chosen from the group formed by:

$SiO_2$ and $GeO_2$;

Q is chosen from the group consisting of: $F^-$, $Cl^-$, $Br^-$, $S^{2-}$, $SO_4^{2-}$, $MoO_4^{2-}$, $PO_4^{3-}$, and $WO_4^{2-}$;
$0 \leq x \leq 0.35$
$0 \leq y \leq 0.8$
$0 < a \leq 2$
$0 < b < 1.5$
$b \leq 2a$; and
$z = 1$ or 2 or 3 according to whether Q is mono-, bi- or tri-valent.

11. A process for forming selective membranes for producing an purifying solutions which contain lithium ions which comprises forming the membranes of a composition corresponding to the general formula:

$$\{B_2O_3, xM, yN\}, aLi_2O, bLi_zQ$$

in which:
M is chosen from the group formed by:

$Al_2O_3$, $V_2O_5$, $P_2O_5$, $As_2O_5$ and $As_2O_3$;
N is chosen from the group formed by:

$SiO_2$ and $GeO_2$;

Q is chosen from the group consisting of: $F^-$, $Cl^-$, $Br^-$, $S^{2-}$, $SO_4^{2-}$, $MoO_4^{2-}$, $N^{3-}$, $PO_4^{3-}$ and $WO_4^{2-}$;
$0 \leq x \leq 0.35$
$0 \leq y \leq 0.8$
$0 < a \leq 2$
$0 < b < 1.5$
$b \leq 2a$; and
$z = 1$ or 2 or 3 according to whether Q is mono-, bi- or tri-valent.

12. A process for forming solid electrolytes for electric cells which comprises forming the solid electrolytes of a composition corresponding to the general formula:

$$\{B_2O_3, xM, yN\}, aLi_2O, bLi_zQ$$

in which:
M is chosen from the group formed by:

$Al_2O_3$, $V_2O_5$, $P_2O_5$, $As_2O_5$ and $As_2O_3$;

N is chosen from the group formed by:

$SiO_2$ and $GeO_2$;

Q is chosen from the group consisting of: $F^-$, $Cl^-$, $Br^-$, $S^{2-}$, $SO_4^{2-}$, $MoO_2^{2-}$, $N^{3-}$, $PO_4^{3-}$, and $WO_4^{2-}$
$0 \leq x \leq 0.35$
$0 \leq y \leq 0.8$
$0 < a \leq 2$
$0 < b < 1.5$
$b \leq 2a$; and
$z = 1$ or 2 or 3 according to whether Q is mono-, bi- or tri-valent.

13. The process of claim 12 wherein the composition has one of the following formula:

$B_2O_3$, $0.57Li_2O$, $0.57LiCl$ $B_2O_3$, $0.85Li_2O$, $0.29LiCl$ $B_2O_3$, $0.43Li_2O$, $0.29LiCl$ $B_2O_3$, $0.57Li_2O$, $0.21LiCl$ $B_2O_3$, $0.57Li_2O$, $0.21LiBr$ $B_2O_3$, $0.57Li_2O$, $0.29Li_2S$ $B_2O_3$, $0.57Li_2O$, $0.29Li_2SO_4$ $B_2O_3$, $0.57Li_2O$, $0.14Li_3PO_4$
$B_2O_3$, $0.57Li_2O$, $0.14Li_3N$ $B_2O_3$, $0.57Li_2O$, $0.28Al_2O_3$, LiCl $B_2O_3$, $0.57Li_2O$, $0.14Al_2O_3$, $0.28Li_2SO_4$ $B_2O_3$, $0.57Li_2O$, $0.14P_2O_5$, $0.21LiBr$ $B_2O_3$, $0.57Li_2O$, $0.21LiBr$, $0.14Al_2O_3$ $B_2O_3$, $0.57Li_2O$, $0.14Li_3PO_4$, $0.14Al_2O_3$ $B_2O_3$, $0.57Li_2O$, $0.14Al_2O_3$, $0.57LiF$ $B_2O_3$, $0.57Li_2O$, $0.14Al_2O_3$, $0.70LiCl$ $B_2O_3$, $0.57SiO_2$, $1.70Li_2O$, $Li_2SO_4$ $B_2O_3$, $0.43Si_2O$, $Li_2O$, $1.14Li_2SO_4$ $B_2O_3$, $0.57SiO_2$, $1.5Li_2O$, $Li_2SO_4$
$B_2O_3$, $0.43SiO_2$, $1.43Li_2O$, $1.14Li_2SO_4$.

14. Electric cells which include an anode based on lithium, a cathode mode of a material with a host structure for lithium and an amorphous cationic conductor of lithium comprising a composition corresponding to the general formula:

$$\{B_2O_3, xM, yN\}, aLi_2O, bLi_zQ$$

in which:
M is chosen from the group formed by:

$Al_2O_3$, $V_2O_5$, $P_2O_5$, $As_2O_5$ and $As_2O_3$;

N is chosen from the group formed by:

$SiO_2$ and $GeO_2$;

Q is chosen from the group consisting of; $F^-$, $Cl^-$, $Br^-$, $S^{2-}$, $SO_4^{2-}$, $MoO_4^{2-}$, $N^{3-}$, $PO_4^{3-}$ and $WO_4^{2-}$
$0 \leq x \leq 0.35$
$0 \leq y \leq 0.8$
$0 < a \leq 2$
$0 < b < 1.5$
$b \leq 2a$; and $z = 1$ or 2 or 3 according to whether Q is mono-, bi- or tri-valent.

15. Electric cells according to claim 14, in which the cathode is made of titanium sulphide.

16. The electric cells of claim 14 wherein the amorphous cationic conductor has one of the following formula:

$B_2O_3$, $0.57Li_2O$, $0.57LiCl$ $B_2O_3$, $0.85Li_2O$, $0.29LiCl$ $B_2O_3$, $0.43Li_2O$, $0.29LiCl$ $B_2O_3$, $0.57Li_2O$, $0.21LiCl$ $B_2O_3$, $0.57Li_2O$, $0.21LiBr$ $B_2O_3$, $0.57Li_2O$, $0.29Li_2S$ $B_2O_3$, $0.57Li_2O$, $0.29Li_2SO_4$ $B_2O_3$, $0.57Li_2O$, $0.14Li_3PO_4$ $B_2O_3$, $0.57Li_2O$, $0.14Li_3N$ $B_2O_3$, $0.57Li_2O$, $0.28Al_2O_3$, $LiCl$ $B_2O_3$, $0.57Li_2O$, $0.14Al_2O_3$, $0.28Li_2SO_4$ $B_2O_3$, $0.57Li_2O$, $0.14P_2O_5$, $0.21LiBr$ $B_2O_3$, $0.57Li_2O$, $0.2LiBr$, $0.14Al_2O_3$ $B_2O_3$, $0.57Li_2O$, $0.14Li_3PO_4$, $0.14Al_2O_3$ $B_2O_3$, $0.57Li_2O$, $0.14Al_2O_3$, $0.57LiF$ $B_2O_3$, $0.57Li_2O$, $0.14Al_2O_3$, $0.70LiCl$ $B_2O_3$, $0.57SiO_2$, $1.70Li_2O$, $Li_2SO_4$ $B_2O_3$, $0.43SiO_2$, $Li_2O$, $1.14Li_2SO_4$ $B_2O_3$, $0.57SiO_2$, $1.5Li_2O$, $Li_2SO_4$ $B_2O_3$, $0.43SiO_2$, $1.43Li_2O$, $1.14Li_2SO_4$.

* * * * *